4/1/86 XR 4,579,282

United States Patent [19]

Navara et al.

[11] Patent Number: 4,579,282

[45] Date of Patent: Apr. 1, 1986

[54] GAS BURNER FOR WIRE FED METAL-SPRAYING PISTOL

[75] Inventors: Václav Navara, Prague; Frantisek Novák; Josef Jezek, both of Ledec, both of Czechoslovakia

[73] Assignee: Stani vyzkumny ustav ochrany materiału G.V. Akimova, Prague, Czechoslovakia

[21] Appl. No.: 515,941

[22] Filed: Jul. 20, 1983

[51] Int. Cl.[4] .................................................. B23K 9/00

[52] U.S. Cl. ............................... 239/83; 219/121 PP; 219/121 PQ

[58] Field of Search ........................ 239/79, 81, 83, 84; 219/121 P, 121 PL, 121 PM, 121 PN, 121 PP, 121 PQ

[56] References Cited

U.S. PATENT DOCUMENTS

| | | | |
|---|---|---|---|
| 2,092,150 | 9/1937 | Bleakley | 239/83 |
| 2,754,225 | 7/1956 | Gfeller | 239/81 |
| 3,378,203 | 4/1968 | Stanton | 239/84 |
| 4,463,245 | 7/1984 | McNeil | 219/121 PM |

*Primary Examiner*—Andres Kashnikow

[57] ABSTRACT

A gas burner for a metal-spraying pistol wherein wire is melted and the melt is atomized by gas flame. The burner is characterized in that a jet insert of abrasion resistant material which is positioned in the jet and serves for the advance of the wire, is separated on most of its surface from the jet, or from other parts of the burner, by an air gap which communicates, on the one hand, with a pressure air supply and, on the other hand, with a space provided between the jet insert and the wire.

3 Claims, 4 Drawing Figures

GAS BURNER FOR WIRE FED METAL-SPRAYING PISTOL

The invention relates to an improved gas burner for wire processing metal-spraying pistols wherein a metal wire is melted by gas flame and the melt thereof is atomized.

The essential parts of a gas burner for metal-spraying pistols are a jet and a nozzle. The wire to be melted and atomized is supplied to the pistol and is passed axially through the pistol jet. To prevent the jet from being worn by the wire, an insert of hardened steel is disposed in the jet and the wire is advanced therethrough. A mixture of the combustion gases, such as, usually, oxygen and acetylene, is supplied through a plurality of apertures symmetrically spaced apart around the wire. The jet is surrounded by the nozzle and always recedes relative thereto so that the nozzle orifice is situated in front of the jet mouth. The space in the nozzle between its outlet orifice and the jet mouth forms a combustion chamber in which the supplied combustable mixture is burned to heat the wire. The flame is separated from the nozzle walls by air which flows in a thin layer along said nozzle walls in the direction to the nozzle discharge opening. Through the center of said opening there is passed wire about which the combustion products flow; cooling air flows through the largest distance from the center. The nozzle outlet opening should have as small a cross-section as possible so as to eject the gas at a high velocity. The fast flowing gas stream upstream of the nozzle superficially melts the wire and atomizes the melt.

To achieve the relatively high outflow velocity of gas ejected from the nozzle outlet, a sufficient superatmospheric pressure has to prevail in the combustion chamber. The wire which is supplied through the jet insert into the combustion chamber has to pass therethrough with a certain play. For this reason, due to the superatmospheric pressure in the combustion chamber, hot gas flow would return through the space between the wire and the jet insert back along the wire, and overheat the jet, which would cause some disadvantages such as short lifetime of jet, back firing, or the like. Therefore the aperture in the jet through which the wire is fed is supplied with pressure air which flows away around the wire in the counterdirection of the wire advance. Such flowing of air produces an overpressure which approximately compensates for the superatmospheric pressure in the combustion chamber so that the hot gas is prevented from flowing back along the wire.

The above-mentioned situation wherein the overpressure produced in the jet cavity corresponds to that in the combustion chamber, is rather of a theoretical character. In practice, the pressure values in the combustion chamber and in the jet cavity vary in accordance with operation conditions and depend, above all, upon the preset values of both combustion gas and air pressures.

If the air pressure in the jet cavity is higher than the pressure in the combustion chamber, then air will flow into the combustion chamber through the space between the wire and the jet insert. The air flowing along the wire separates the wire from flame up to a path section necessary to provide mixing of the air with flame. Consequently, the pistol has a relatively low output.

When, to the contrary, the air pressure in the jet cavity is lower than that in the combustion chamber, it is the hot combustion products that flow back along the wire through the space between the jet insert and the wire. It is admitted that these products heat the wire so that the pistol output will rise but, on the other hand, they simultaneously heat the jet and reduce its lifetime. During an intensive heating of the jet, a back-firing may occur so that the flame in the combustion will penetrate through apertures in the jet up to the injector. In such case, the burner has to be immediately put out of service and cleaned. In case of a more serious failure, the burner or some parts thereof have to be exchanged.

To reduce the harmfulness of the above-described failures as much as possible, the bore in the jet insert is usually made as small as possible. This, however, makes trouble in the wire blank advance. A curved or otherwise deformed wire, namely, will not pass through such a small-diameter opening in the jet insert.

The present invention has among its objects the elimination of the drawbacks of the prior art as hereinabove set forth, and to provide an improved gas burner for wire processing metal-spraying pistols, comprising a jet for supplying combustion gases to a combustion chamber, and an insert of abrasion-resistant material received in said jet and designed for supplying wire.

According to the invention, the jet insert is separated on most of its surface from the jet, or from other parts of the burner, by an air gap, respectively, said air gap preferably communicating, on the one hand, with a pressure air supply, and, on the other hand, with a space provided between the jet insert and the wire.

In accordance with a feature of the invention, the jet insert has a front face which recedes relative to the front face of the jet, thus forming a forechamber which communicates with the pressure air supply through channels which are preferably oriented obliquely to the burner axis.

In accordance with another feature of the invention the space between the jet insert and the wire is several times conically flared, the conicity angle exceeding 24°.

Finally, a feature of the invention consists in that an aerating hole is provided in the jet insert for connecting the air gap with the space between the jet insert and the wire, said aerating duct being disposed tangentially to such space.

In order that the invention may be better understood, some preferred embodiments thereof will be hereinafter described with reference to the accompanying schematic drawings, in which.

Figure 1:
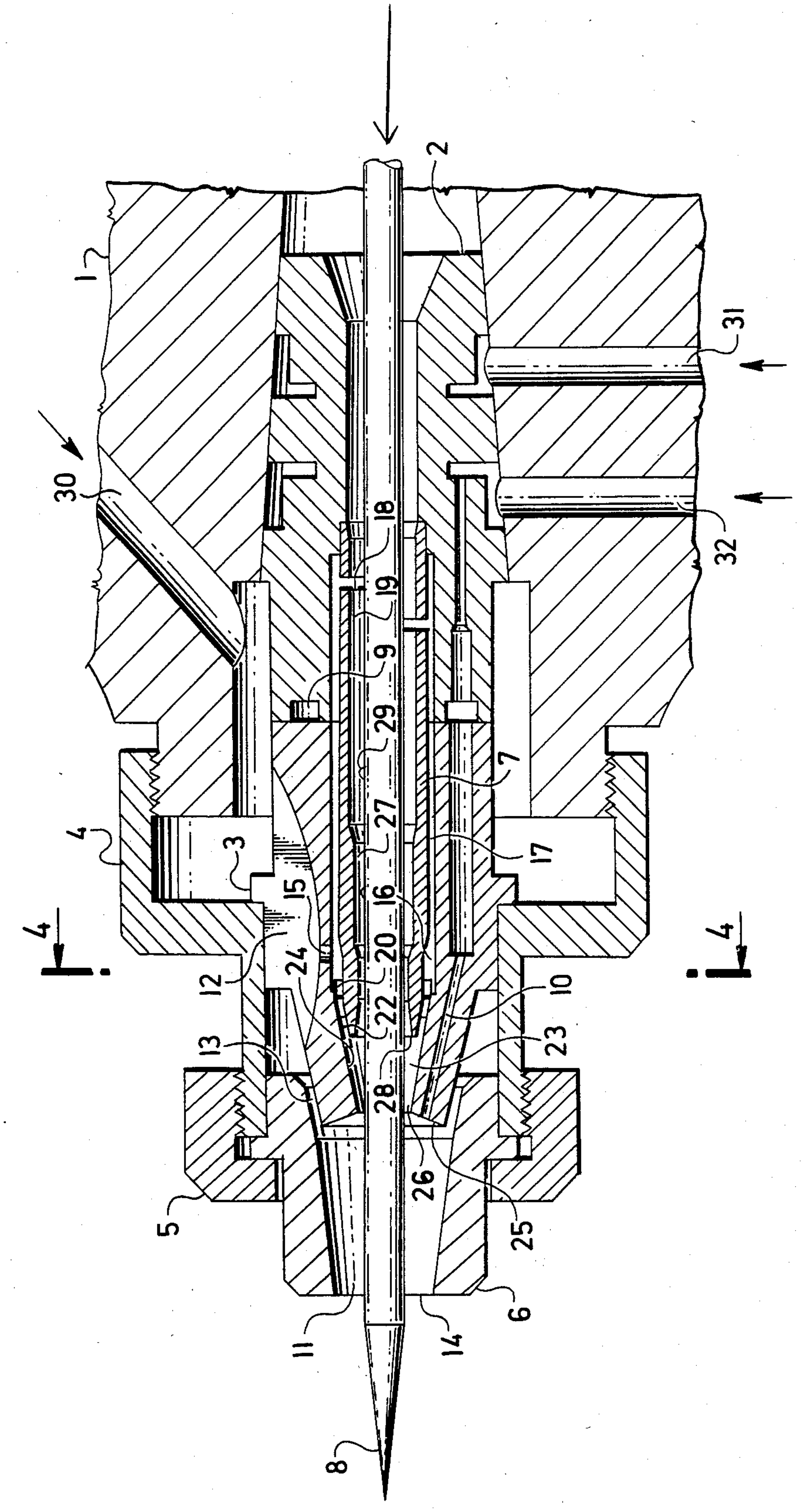
FIG. 1 is an axial sectional view of the gas burner.
Figure 2:
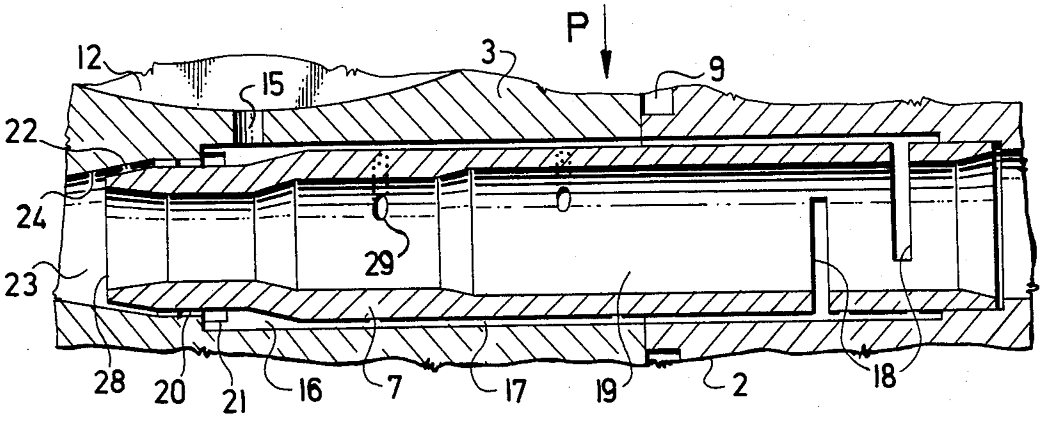
FIG. 2 is a detail axial sectional view taken along line 2—2 in FIG. 4 of the jet insert showing an intermediate portion of FIG. 1; for the sake of clarity, the wire passing through the jet insert has been omitted here.
Figure 3:
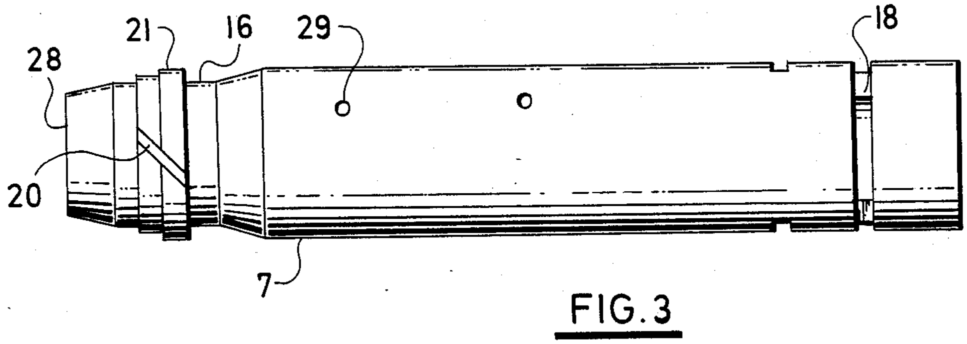
FIG. 3 is a detail view showing the jet insert when viewed in the direction of arrow P in FIG. 2.

Turning now to the drawings, and particularly FIG. 1 thereof, it can be seen that the metal-spraying pistol comprises a hollow body 1 which accomodates an injector 2 in its conically ground interior. The injector 2 is in close contact with a jet 3 which is secured thereto by a clamp sleeve 4. By means of a nut 5 a nozzle 6 is fixedly attached to said clamp sleeve 4. In the interior of the jet 3, and partly also in the interior of the injector 2, there is received a jet insert 7. A wire 8 to be melted and sprayed is axially advanced through the gas burner.

In the pistol body 1 there is provided a pressure air supply 30 as well as supplies of combustion gases, viz. an oxygen supply 31 and an acetylene supply 32.

Figure 4:
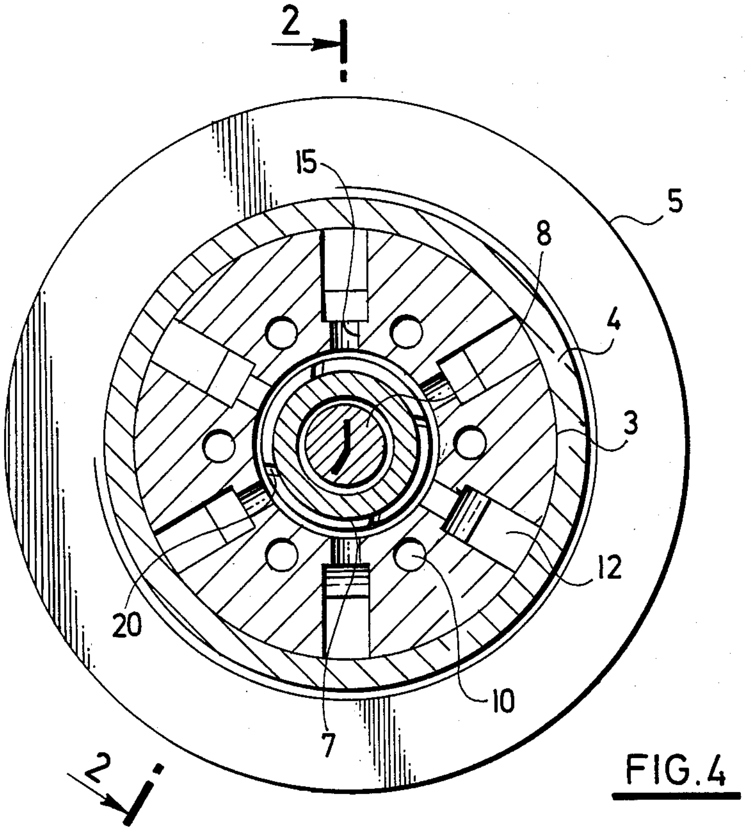
FIG. 4 is a cross-sectional view of the burner taken along the line 4—4 in FIG. 1.

Combustion gases are delivered by the injector 2 into an annular recess 9 in the jet 3, and therefrom through six ducts 10 (FIG. 4) into a combustion chamber 11 where they are burned. Air is supplied through six cutouts 12 in the jet 3 to an annular space 13 through which it enters the combustion chamber 11. The combustion chamber 11 constitutes a part of the hollow space in the nozzle 6 which space is defined, at one side, by a front face 25 and, at the other side, by an outlet hole 14. Through said hole 14 in the nozzle 6, combustion products are ejected from the combustion chamber 11 and serve for melting and atomizing the wire 8 to be sprayed.

From the cutouts 12, air is led through supply holes 15 to a neck 16 on the jet insert 7 to cool it, whereupon it is divided into two flows. A major portion of air flows backwards through an air gap 17 and is designed for cooling the surface of the jet insert 7. Cooling air is then discharged through several outlet apertures 18 in the jet insert 7 and through its cavity 19 around the wire 8 to the ambient atmosphere.

A portion of air fed through the supply holes 15 flows from the neck 16 through several channels 20 in a collar 21, and through an annular gap 22 into a forechamber 23. The latter forms a part of the cavity in the jet 3 and is defined, at one side, by the front face 28 of the jet insert 7 and, at the other side, by a connecting duct 26 through which the forechamber 23 communicates with the combustion chamber 11. The channels 20 are oblique so that they cause the air to rotate and to flow along the inner wall 24 of the jet 3 up to said connecting duct 26 where air is mixed with combustion products.

Due to a superatmospheric pressure in the combustion chamber 11, the combustion products intermixed with air supplied into the forechamber 23, flow back, which means in counterdirection of the wire advance (to the right in FIG. 1). They flow along the wire 8 through the forechamber 23 and further on through a space 27 between the wire 8 and the jet insert 7. The space 27 is several times conically reduced in diameter or necked-in (two frusto-conical zones are shown), the apex angle of the necked-in zones exceeding an angle of 24°. The flares are designed for separating the combustion product flow from the inner walls of the jet insert 7 and for causing said flow to adhere to the wire 8. Thus the wire 8 is heated by the combustion products substantially more intensively than the wire insert 7. Apart from this, said widened spaces are supplied with air through a tangential aerating hole 29.

In this way, the combustion products transfer the heat, above all, to the wire 8 while heating the jet insert 7 only gently. Moreover, said insert is intensively cooled on its external surface by air flowing through the air gap 17.

At last, the combustion products which have been cooled by the contact with the wire, are mixed with air discharged out of the outlet apertures 18. Thereby their temperature further drops so that they cannot damage the other pistol parts with which they come into contact.

The space 27 is conically flared in the forward direction in the jet insert 7 from its narrowest place to the tip (lefthand end) of the insert. If the wire feed is stopped, due to a malfunction of a feed mechanism (not shown), the leading wire end is melted in the combustion chamber, or in the forechamber, and forms a drop which will become solid. The conical flare of the mouth of the space 27, which extends into the forechamber 23, will facilitate the release of said drop.

The above-described burner arrangement allows a larger amount of hot gas to flow backwards along the wire than is possible with the conventional burners, while the hot gas heat is transferred to the wire 8 to a substantially higher extent than to the other pistol parts. Thus the combustion product utilization also rises. The pistol output increases, and the specific gas consumption per one kilogram of sprayed metal is reduced. Apart from this, both the jet insert 7 and the jet 3 are intensively cooled by air throughflow so that their service life is prolonged.

According to the invention, the cavity 19 in the jet insert 7 can have, for one and the same wire diameter, a larger diameter than is usual, so that the space 27 is wider than with conventional metal spraying pistols. This measure makes the passage of deformed wire easier and increases the reliability of the pistol operation.

Although the invention is described and illustrated with reference to a single preferred embodiment thereof, it is to be expressly understood that it is in no way limited to the disclosure of such preferred embodiment but is capable of numerous modifications within the scope of the appended claims.

We claim:

1. A gas burner for a wire-processing metal-spraying pistol, the burner comprising:

a jet having a front face rearwardly delimiting a combustion chamber;

means including feed passages opening directly only into the combustion chamber for supplying combustion gases to the combustion chamber forward of the front face;

a jet insert of abrasion-resistant material received in said jet and having a front face spaced backward from the front face of the jet and forming rearward of the combustion chamber a forechamber;

means for supplying a fusible wire through the insert and through the forechamber to the combustion chamber; and means including channels opening directly into the forechamber for feeding air via these channels under pressure to the forechamber, whereby the air and combustion gases burn in the combustion chamber to melt the wire and expel it forward from the burner.

2. A gas burner as claimed in claim 1, wherein the jet and jet insert are centered on a burner axis and the channels are oriented obliquely to the burner axis.

3. A gas burner as claimed in claim 2, wherein the jet insert and the wire define a space that has an entry end and, axially offset therefrom, a rear end and that is several times conically reduced in diameter in axially spaced zones from the entry end to the exit end with a conicity angle exceeding 24°, the jet insert being formed with an aerating hole connected to the air-supply means to receive pressurized air therefrom and opening tangentially into the space between the jet insert and the wire.

* * * * *